United States Patent
Perkinson et al.

(10) Patent No.: US 10,094,293 B2
(45) Date of Patent: Oct. 9, 2018

(54) IN FLIGHT RESTART SYSTEM AND METHOD FOR FREE TURBINE ENGINE

(71) Applicants: Pratt & Whitney Canada Corp., Longueuil (CA); Hamilton Sundstrand Corporation, Windsor Locks, CT (US)

(72) Inventors: Robert H. Perkinson, Stonington, CT (US); Richard Ullyott, St. Bruno (CA)

(73) Assignees: PRATT & WHITNEY CANADA CORP., Longueuil, Quebec (CA); HAMILTON SUNDSTRAND CORPORATION, Windsor Locks, CT (US)

( * ) Notice: Subject to any disclaimer, the term of this patent is extended or adjusted under 35 U.S.C. 154(b) by 838 days.

(21) Appl. No.: 14/466,197

(22) Filed: Aug. 22, 2014

(65) Prior Publication Data
US 2016/0053690 A1  Feb. 25, 2016

(51) Int. Cl.
*F02C 7/266* (2006.01)
*F02C 3/10* (2006.01)
(Continued)

(52) U.S. Cl.
CPC .............. *F02C 7/266* (2013.01); *B64D 27/10* (2013.01); *F02C 3/10* (2013.01); *F02C 3/145* (2013.01);
(Continued)

(58) Field of Classification Search
CPC .. F02C 3/10; F02C 3/145; F02C 7/266; F02C 7/262; F02C 7/275; F02C 7/268;
(Continued)

(56) References Cited

U.S. PATENT DOCUMENTS 2,525,694 A * 10/1950 Lindsey ............... B64C 11/303
                                                    416/36
2,959,228 A * 11/1960 Larkin ................. B64C 11/325
                                                    416/30
(Continued)

FOREIGN PATENT DOCUMENTS

CA         1096185 A       2/1981
DE     102010049885 A1     5/2012
(Continued)

OTHER PUBLICATIONS

Hartman, Negative Thrust and Torque Characteristics of an Adjustable-Pitch Metal Propeller (1934), NACA Report No. 464.*
(Continued)

*Primary Examiner* — William H Rodriguez
*Assistant Examiner* — Jason H Duger
(74) *Attorney, Agent, or Firm* — Bachman & LaPointe, P.C.

(57) ABSTRACT

There is described a method and system for in-flight start of an engine. The method comprises rotating a propeller; generating electrical power at an electric generator embedded inside a propeller hub from rotation of the propeller; transmitting the electrical power from the electric generator to an engine starter mounted on a core of the engine via an electric power link; and driving the engine with the engine starter to a sufficient speed while providing fuel to a combustor to light the engine to achieve self-sustaining operation of the engine.

7 Claims, 4 Drawing Sheets

(51) Int. Cl.
*F02C 3/14* (2006.01)
*F02C 7/262* (2006.01)
*B64D 27/10* (2006.01)
*F02C 7/26* (2006.01)
*F02C 7/275* (2006.01)

(52) U.S. Cl.
CPC .............. *F02C 7/26* (2013.01); *F02C 7/262* (2013.01); *F02C 7/275* (2013.01); *F05D 2220/325* (2013.01); *F05D 2220/34* (2013.01); *F05D 2220/76* (2013.01); *F05D 2270/092* (2013.01)

(58) Field of Classification Search
CPC ...... F02C 9/46; F02C 9/58; F02C 7/26; B64C 11/34; B64D 27/10; F01D 19/00; F05D 2220/325; F05D 2220/34; F05D 2220/76; F05D 2260/85; F05D 2270/092; F05D 2270/093
See application file for complete search history.

(56) References Cited

U.S. PATENT DOCUMENTS

| | | | |
|---|---|---|---|
| 3,973,873 A * | 8/1976 | Shank | B64C 11/40 416/160 |
| 4,271,940 A | 6/1981 | Collin | |
| 4,556,366 A * | 12/1985 | Sargisson | B64C 11/44 310/115 |
| 5,899,411 A | 5/1999 | Latos et al. | |
| 6,422,816 B1 * | 7/2002 | Danielson | B64C 11/301 415/36 |
| 6,467,725 B1 | 10/2002 | Coles et al. | |
| 6,676,379 B2 | 1/2004 | Eccles et al. | |
| 6,769,874 B2 | 8/2004 | Arel | |
| 6,855,089 B2 | 2/2005 | Poulin et al. | |
| 6,895,741 B2 | 5/2005 | Rago et al. | |
| 7,077,631 B2 | 7/2006 | Eccles et al. | |
| 7,104,918 B2 | 9/2006 | Mitrovic | |
| 7,144,349 B2 | 12/2006 | Mitrovic | |
| 7,513,119 B2 | 4/2009 | Zielinski et al. | |
| 7,861,533 B2 * | 1/2011 | Dooley | F02C 7/32 60/778 |
| 8,162,611 B2 | 4/2012 | Perkinson et al. | |
| 8,375,695 B2 | 2/2013 | Schilling et al. | |
| 8,519,555 B2 | 8/2013 | Dooley et al. | |
| 8,573,927 B2 | 11/2013 | Swift et al. | |
| 2010/0236216 A1 * | 9/2010 | Winter | F01D 21/00 60/204 |
| 2012/0083173 A1 * | 4/2012 | McMillan | B63H 21/20 440/6 |
| 2012/0133150 A1 * | 5/2012 | Dooley | F01D 15/10 290/1 A |
| 2012/0156039 A1 | 6/2012 | Bulin et al. | |
| 2012/0167590 A1 * | 7/2012 | Bettner | F02C 7/262 60/786 |
| 2013/0071232 A1 | 3/2013 | Taneja et al. | |
| 2013/0327014 A1 | 12/2013 | Moulebhar | |
| 2014/0303871 A1 * | 10/2014 | Presse | B64D 41/00 701/100 |
| 2015/0367950 A1 * | 12/2015 | Rajashekara | B64C 11/305 701/3 |
| 2016/0229549 A1 | 8/2016 | Mitrovic et al. | |

FOREIGN PATENT DOCUMENTS

| | | |
|---|---|---|
| EP | 1785614 A2 | 5/2007 |
| EP | 2562085 A2 | 2/2013 |
| GB | 2461786 A | 1/2010 |
| WO | 03/078248 A1 | 9/2003 |

OTHER PUBLICATIONS

European Search Report for EP Patent Application No. 15181841.6, dated Dec. 14, 2015.
European Search Report for EP Patent Application No. 15177857.8, dated Nov. 20, 2015.

* cited by examiner

IN FLIGHT RESTART SYSTEM AND METHOD FOR FREE TURBINE ENGINE

TECHNICAL FIELD

The application relates generally to aircraft engines and, more particularly, to in-flight restarts of aircraft engines having free turbine configurations.

BACKGROUND OF THE ART

Free turbine turbo-propeller engines have relatively poor in-flight windmill characteristics. High airspeeds must be achieved to get core wind-milling speeds and internal flow up to a point where the engine may be re-started without external power assist. In some cases, it may be necessary to fly at 70 to 80% cruise airspeed for satisfactory pure windmill starts. To achieve this with one or more unplanned shutdown of an engine, it would be necessary to put the aircraft into a dive with a resulting loss of altitude. This option may not be available close to the ground. To restart at lower speeds, it is necessary to use aircraft power or battery power to assist the start. Using the engine starter motor battery power alone may not be sufficient to start a large high pressure ratio free turbine turboprop. This means that certain unplanned engine shutdown cases addressed by current turboprop aircrafts, which can battery start in-flight, are not covered without an additional energy power source on the aircraft.

SUMMARY

In one aspect, there is provided a method for in-flight start of an engine. The method comprises rotating a propeller; generating electrical power at an electric generator embedded inside a propeller hub from rotation of the propeller; transmitting the electrical power from the electric generator to an engine starter mounted on a core of the engine via an electric power link; and driving the engine with the engine starter to a sufficient speed while providing fuel to a combustor to light the engine to achieve self-sustaining operation of the engine.

In another aspect, there is provided an in-flight engine starting system for an aircraft. The system comprises: a propeller subsystem comprising a propeller, an actuator coupled to the propeller, and an electric generator coupled to the propeller, the propeller having wind milling capabilities when the engine is not operable during flight; an engine starter mounted to a core of a free turbine engine; and an electric connection provided between the propeller subsystem and the engine starter for carrying power generated by the electric generator during wind milling of the propeller to the engine starter to start the engine.

In a further aspect, there is provided an aircraft propeller system comprising: a propeller through which ambient air may be propelled, the propeller coupled to an actuator for modifying blade pitch and; an electric generator coupled to the propeller and configured to generate power from a wind milling of the propeller; and a bidirectional emergency electric power link coupled to the electric generator and configured to receive control signals for wind milling the propeller and transmit generated power to the aircraft.

DESCRIPTION OF THE DRAWINGS

Reference is now made to the accompanying figures in which.

DETAILED DESCRIPTION

Figure 1:
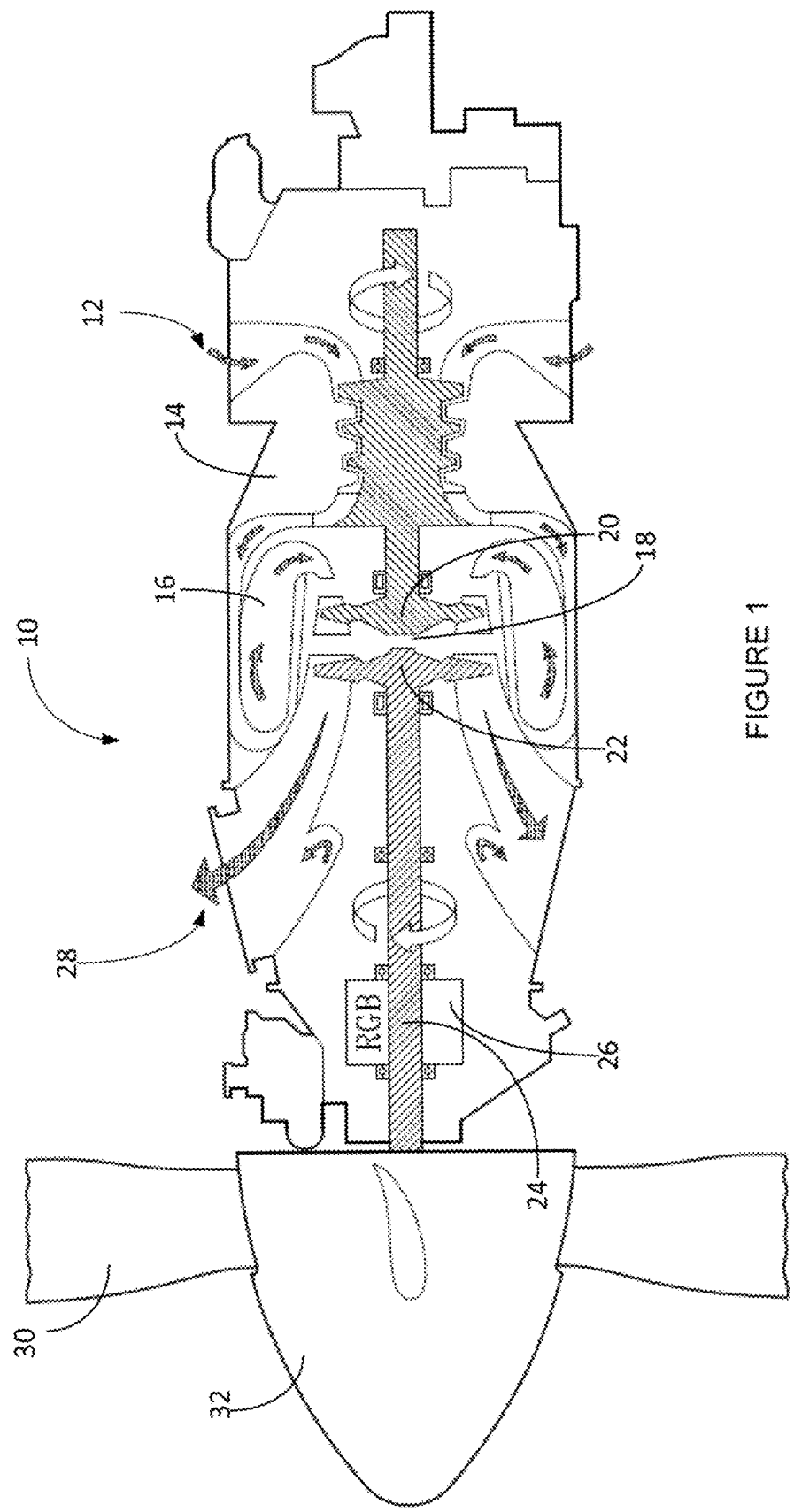
FIG. 1 is a schematic side cross-sectional view of an exemplary gas turbine engine.

FIG. 1 illustrates an exemplary engine 10, namely a gas turbine engine, comprising an inlet 12, through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The turbine section 18 illustratively comprises a compressor turbine 20, which drives the compressor assembly and accessories, and at least one power or free turbine 22, which is independent from the compressor turbine 20 and drives the rotor shaft 24 through the reduction gearbox 26. Hot gases may then be evacuated through exhaust stubs 28. A rotor 30, in the form of a propeller through which ambient air is propelled, is hosted in a propeller hub 32. Rotor 30 may, for example, comprise a propeller of a fixed-wing aircraft or a main (or tail) rotor of a rotary-wing aircraft such as a helicopter.

The aircraft engine 10 may be used in combination with an aircraft propeller system comprising a propeller coupled to an actuator for modifying blade pitch for wind milling, an electric generator embedded inside a propeller hub, and a bidirectional emergency electric power link coupled to the electric generator and configured to receive control signals for wind milling the propeller and transmit generated power to the rest of the aircraft. Such an aircraft may be without a separate Ram Air Turbine (RAT) system as the aircraft propeller system may be capable of operating in RAT mode and provide emergency power as required. In some embodiments, the propeller may be a variable pitch propeller with RAT mode having independent inbuilt over-speed or excess drag protection, and/or having independent means for governing. In some embodiments, the actuator is also used for constant speed propulsion. Alternatively, the actuator is dedicated to wind milling mode.

Figure 2:
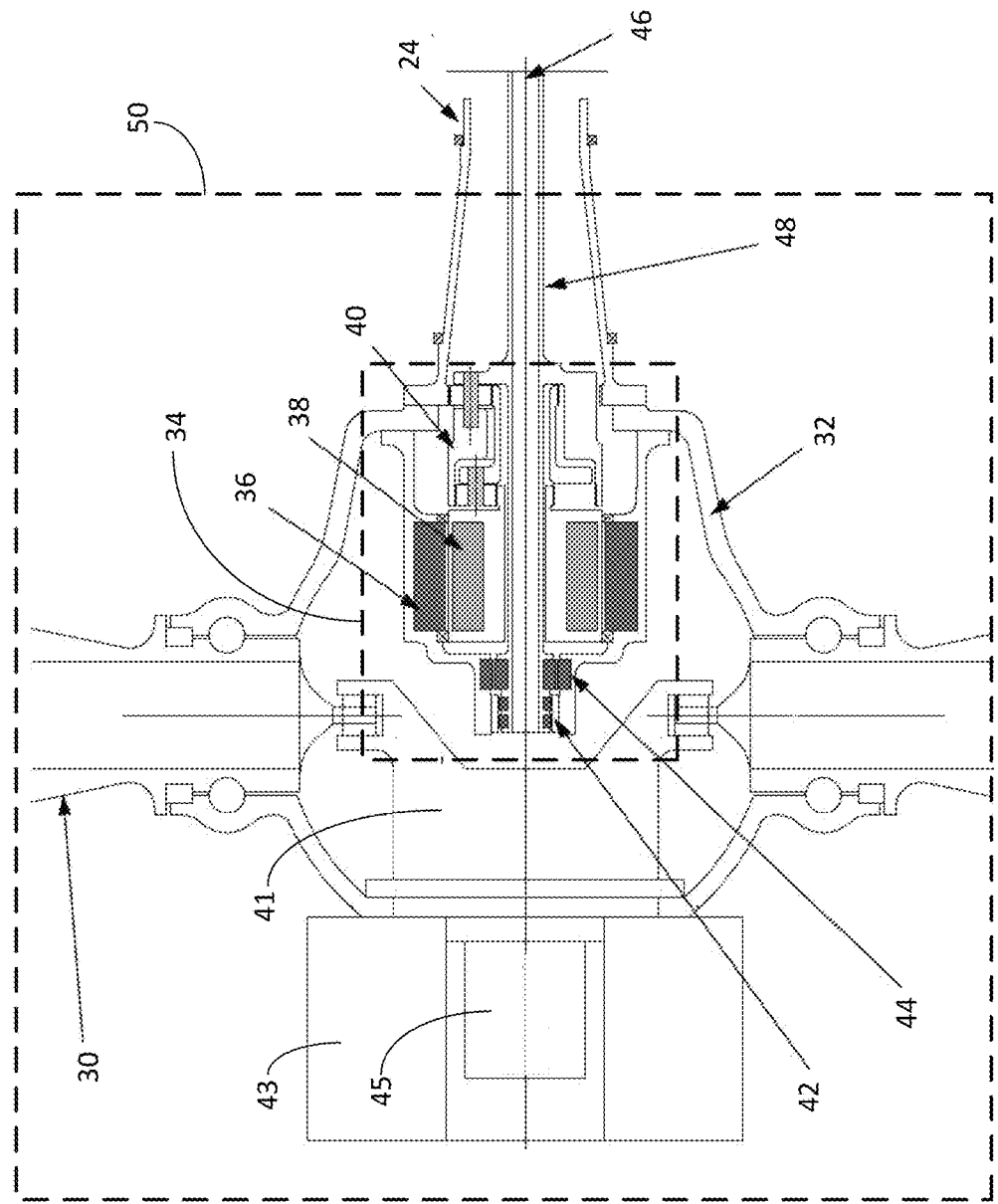
FIG. 2 illustrates an exemplary embodiment for a propeller hub having an integrated electric generator.

Turning to FIG. 2, there is illustrated in more detail an aircraft propeller system, or propeller subsystem 50. The propeller hub 32 is shown to comprise an electric generator 34 embedded inside the hub 32. In the exemplary embodiment illustrated, the electric generator 34 comprises generator coils 36 coupled to permanent magnets 38 for inducing voltage in the coils 36. The permanent magnets 38 are actuated by compound planetary gear stages 40 to cause the motion needed to induce the voltage. The windings of the generator coils 32 are set to rotate with the propeller 30 so as to avoid the need for sliding contact (slip rings and brushes) to provide electrical power to the propeller 30. An electric pitch change actuator 41 is coupled to the propeller blades 30 for effecting feathering/unfeathering as required, in cooperation with a pitch change motor 45 and an electronic propeller control (EPC) 43. The propeller blades 30 may have electrical de-icing elements powered by the electric generator 34.

A non-rotating torque tube 48 extends from the electric generator 34 through the shaft 24. Inside the torque tube 48 is an access for electric wires 46 used for signals and auxiliary electrical power. This access may also provide an independent route for hydraulic power to the electric pitch change actuator 41 or a mechanical linkage in addition to or independently from any electric wires 46 provided therethrough. The electrical path may also be used for communication with inductive (transformer) coupling 44 or auxiliary power supply (brushes) 42. Inductive coupling may also be used for power supply, with a limited power capability.

Figure 3:
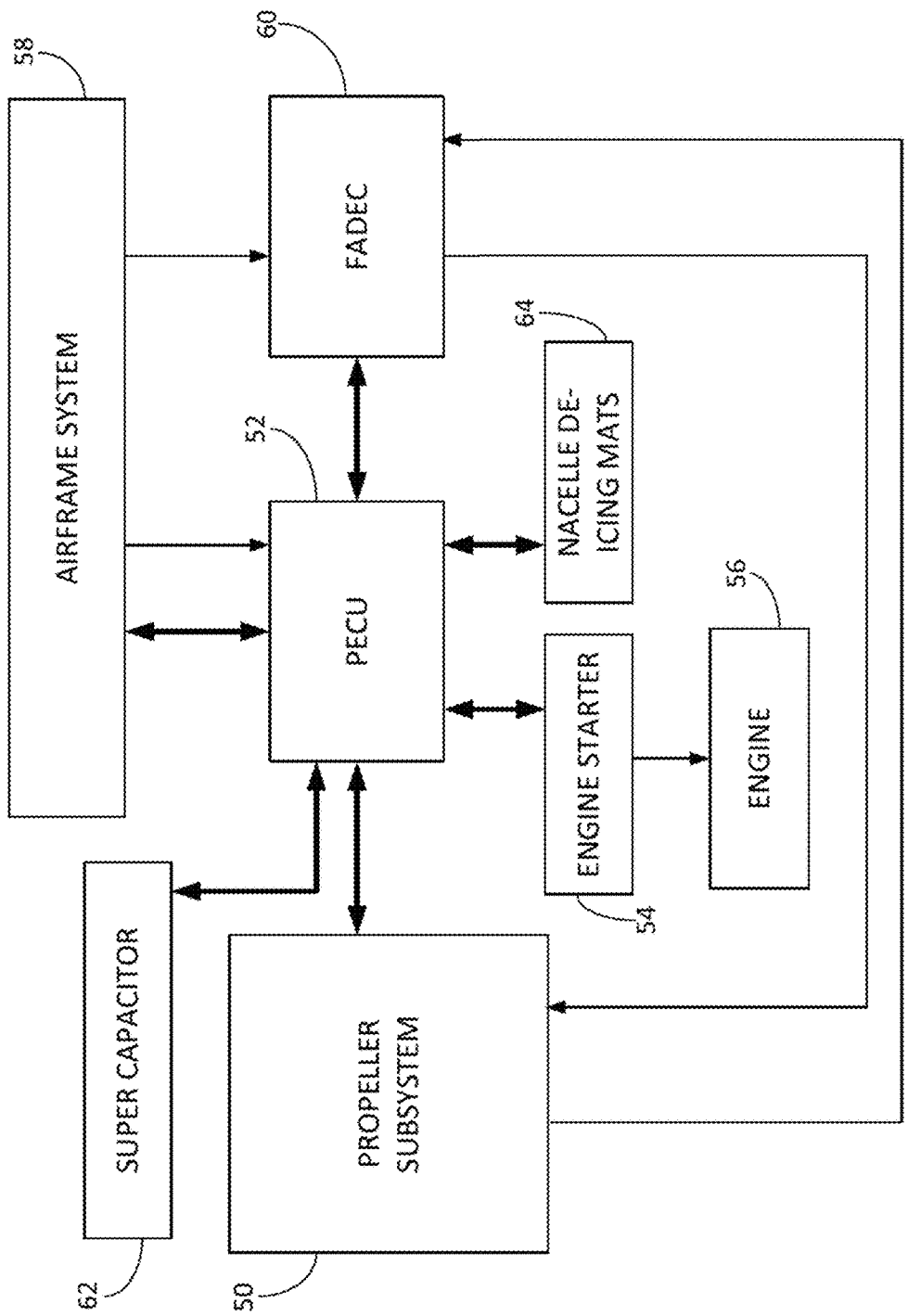
FIG. 3 is a block diagram of an exemplary in-flight engine starting system.

Referring to FIG. 3, there is illustrated an in-flight engine starting system. An engine starter 54 mounted to a core of an engine 56 is operatively coupled to the propeller subsystem 50 via an electric connection, effected by the electric wires provided in the access of the torque tube 48. The dark and double-ended arrows shown in the figure are representative of a bidirectional link. As per some embodiments of the system, the electric connection is a bi-directional link that serves as an emergency electric power link for sending feather/unfeather and wind milling commands and/or power for same from the aircraft to the propeller subsystem 50, and for exporting electric power generated by the electric generator 34 in the propeller subsystem 50 to the rest of the aircraft once the propeller is unfeathered and wind milling. This bidirectional link is in addition to the normal Full Authority Digital Engine Control (FADEC) channels which manage pitch control and governing when the engine 56 is fully operating. The bidirectional link may be a two wire system and the system may be single phase AC. The system may also be DC upon addition of a three phase rectifier within the propeller subsystem 50.

In some embodiments, a power-plant electrical control unit (PECU) 52 is operatively connected between the propeller subsystem 50 and the engine starter 54 using the bidirectional link. The PECU 52 may be configured to manage all of the electrical power flow in the power-plant area of the aircraft. The PECU 52 may be configured to perform a wide variety of tasks. For example, the PECU 52 may respond to commands from a FADEC 60 and an airframe system 58 in order to configure an integrated power plant system (IPPS) power system. It may provide emergency feather/unfeather power to the propeller subsystem 50 from the airframe system 58 independent of the FADEC 60. It may provide RAT power from the windmilling of the propeller via the electric generator 34 to an aircraft emergency electrical system. The PECU 52 may provide RAT power from the electric generator 34 to the engine starter 54 such that the power from the windmilling propeller 30 may assist in engine start in-flight.

The PECU 52 may be configured to schedule power to other nacelle consumers, such as nacelle inlet de-icing mats 64 in normal operation. In addition to this, the PECU 52 may use its connection to various passive loads temporarily during emergencies to achieve speed control or load leveling on transients. For example, this may be useful to replace loss of another load which might otherwise lead to over-speed transients while in propeller windmilling mode.

In some embodiments, the PECU 52 may be linked to a super capacitor 62 to help with transients and short term "peak lopping" capabilities, such as during an engine start and propeller feather/unfeather to reduce or eliminate demand on aircraft power supplies, or to absorb energy to slow propeller acceleration transients. The PECU 52 may also be configured to route emergency power to the FADEC 60, either from the airframe system 58 or the electric generator 34, whereby the electric generator 34 acts as a backup to an existing permanent magnet alternator.

In some embodiments, the PECU 52 may comprise voltage and frequency conversion elements such that a variable output from the electric generator 34 can be regulated to match aircraft power quality requirements as well as provide a variable speed starter drive.

The PECU 52 may be connected to the airframe system 58 and the FADEC 60 via the bidirectional link in order to send and receive signals and/or power. From the airframe system 58, the PECU 52 may receive a feather/unfeather command and a command to indicate that RAT mode is required and that the airframe system 58 will accept power from the electric generator 34. From the FADEC 60, the PECU 52 may receive a flight start enable signal. In response to the flight start enable signal, the PECU 52 may allocate priority to starter power supplied from the electric generator 34. The FADEC 60 may output a flight windmill restart enable signal based on an output from an aircraft Air Data Computer (ADC) (not shown). Information such as altitude and airspeed combined with a "weight on wheels" status may allow the FADEC 60 to determine if flight start assist is required and set the enable signal accordingly. A de-icing status signal may also be sent to the PECU 52 from the FADEC 60 in order to turn on nacelle de-icing according to a required schedule. The same signal may be read by the EPC 43 in the propeller subsystem 50 to schedule propeller 30 de-icing. In turn, the de-icing required signal may come to the FADEC 60 from the airframe system 58.

Figure 4:
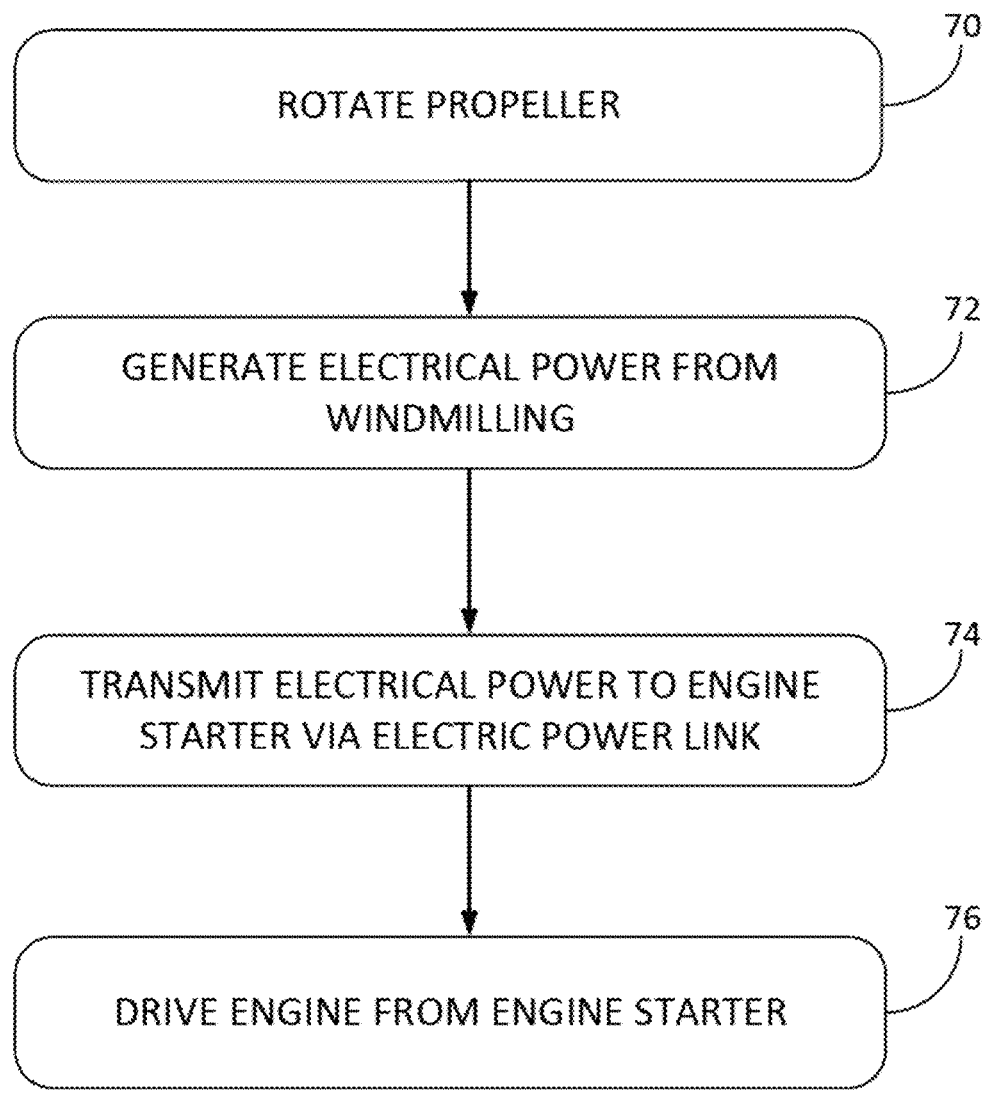
FIG. 4 is a flowchart of an exemplary in-flight engine starting method.

As illustrated in FIG. 4, a method for in-flight engine start comprises rotating the propeller, which in some embodiments comprises modifying blade pitch of the propeller 30 to start wind milling 70. Rotation of the propeller causes electrical power to be generated inside the propeller hub 72 from the electric generator 34. The electrical power may be transmitted to the engine starter 54 via an electric power link 74, and the engine starter 54 may then drive the engine 56 using the electric power 76 generated by the electric generator 34 provided in the propeller hub.

As per the above, communication between the propeller subsystem 50 and the engine starter may occur over a bi-directional emergency electric power link, and a PECU 52 may act as an intermediary between the propeller subsystem 50 and the engine starter 54. The PECU 52 may further route at least a portion of the electrical power to the FADEC 60 and/or the airframe system 58.

The propeller subsystem 50 may be used to monitor a speed of the propeller during rotation and/or monitoring of one of power and torque drawn by the propeller. More particularly, the EPC 43 may be configured to read the frequency and voltage output from the electric generator 34 in the propeller hub and use it as a surrogate propeller speed signal independent of the FADEC 60. This allows the EPC 43 to provide over-speed protection or governing of the propeller 30 in wind-milling mode. For over-speed protection, the frequency or voltage may be compared to a reference. If this reference is exceeded, the EPC 43 may command a propeller feather and shutdown, latching this condition until a new unfeather command is issued. For governing, the EPC 43 may be configured for controlling the pitch change actuator 41 in response to output frequency or voltage from the electric generator 34. This may be done as a result of a speed threshold having been exceeded.

In some embodiments, the EPC 43 may also be configured to provide drag limiting while the system is in RAT mode. For example, scheduled limits of maximum windmilling speed and/or minimum beta based on flight conditions may be applied. In such a case, an active FADEC 60 may be capable of transferring required information to the EPC 43 from the ADC. Alternatively, the FADEC 60 may determine the RAT limits itself and communicate them to the EPC 43. If the RAT mode is required when the FADEC 60 is inactive, the EPC 43 may be provided with sensors (not shown) to determine airspeed, altitude, and ambient temperature. If propeller blade pitch is to be limited, it may also be measured locally by the EPC 43. Such measurements may be taken by putting the sensors on the propeller 30, linking them to blade pitch, and using fixed targets on the RGB 26 housing. Alternatively, beta may also be sensed from pitch actuator position, and speed may be sensed from waveforms generated by the electric generator 34.

In another example, drag limiting may be provided by providing the EPC 43 with indirect limits for the RAT mode. Since the torque or force required to pull a propeller towards fine pitch and increase windmilling speed as well as drag is a function of the air density, airspeed, and rpm, the EPC 43 may be configured to limit actuator torque to avoid being able to pull the propeller 30 into a low enough pitch to cause a drag problem when in RAT mode. In addition, current from the electric generator 34 may be measured by the EPC 43 electronics and used as an indication of the power or torque being drawn by the propeller 30. When combined with some basic air density related information, such as a local ambient pressure from a sensor, this may also be used to make some approximations of propeller drag for limiting purposes.

While illustrated in the block diagram of FIG. 3 as groups of discrete components communicating with each other via distinct data signal connections, it will be understood by those skilled in the art that the present embodiments are provided by a combination of hardware and software components, with some components being implemented by a given function or operation of a hardware or software system, and many of the data paths illustrated being implemented by data communication within a computer application or operating system. For example, the PECU 52 and the EPC 43 may both be provided by a combination of hardware and software, or by hardware or software only. The software may comprise one or more computer-readable instructions for directing a processor to perform specific operations. The hardware may refer to computer hardware and comprise various combinations of processors, microprocessors, data storage elements, hard drive disks, graphical cards, sound cards, motherboards, and chips. The hardware may also refer to electronic hardware such as electronic components and interconnections thereof. The structure illustrated is thus provided for efficiency of teaching the present embodiment.

The above description is meant to be exemplary only, and one skilled in the art will recognize that changes may be made to the embodiments described without departing from the scope of the invention disclosed. For example, the system, devices and methods described herein could be used in helicopters. Still other modifications which fall within the scope of the present invention will be apparent to those skilled in the art, in light of a review of this disclosure, and such modifications are intended to fall within the appended claims.

The invention claimed is:

1. A method for in-flight start of an engine, the method comprising:
   generating electrical power at an electric generator from a rotational speed of a windmillinq propeller;
   monitoring the rotational speed of the windmillinq propeller as a function of at least one of a frequency and a voltage output of the electric generator;
   adjusting the rotational speed of the windmillinq propeller based on at least one of the frequency and the voltage output of the electric generator, the rotational speed of the windmillinq propeller limited when a speed threshold is exceeded;
   transmitting the electrical power from the electric generator to an engine starter mounted to the engine via an electric power link; and
   driving the engine with the engine starter to a sufficient speed while providing fuel to a combustor such that the engine is lit and self-sustaining operation of the engine is achieved.

2. The method of claim 1, wherein transmitting the electrical power from the electric generator to the engine starter via the electric power link comprises transmitting over a bi-directional emergency electric power link.

3. The method of claim 2, wherein transmitting the electrical power from the electric generator to the engine starter via the electric power link comprises transmitting the electrical power via a power-plant electrical control unit.

4. The method of claim 3, further comprising routing at least a portion of the electrical power from the power-plant electrical control unit to at least one of a Full Authority Digital Engine Control (FADEC) unit and an airframe.

5. The method of claim 1, wherein adjusting the rotational speed of the windmillinq propeller comprises commanding a propeller feather when the speed threshold is exceeded.

6. The method of claim 1, wherein adjusting the rotational speed of the windmilling propeller comprises commanding a pitch change when the speed threshold is exceeded.

7. The method of claim 1, further comprising performing active drag limiting of the propeller by limiting actuator torque of the propeller.

* * * * *